No. 769,170. PATENTED SEPT. 6, 1904.
B. KITTLER.
MACHINE FOR MANUFACTURING PEAT BRICKS.
APPLICATION FILED MAR. 22, 1904.
NO MODEL. 2 SHEETS—SHEET 1.
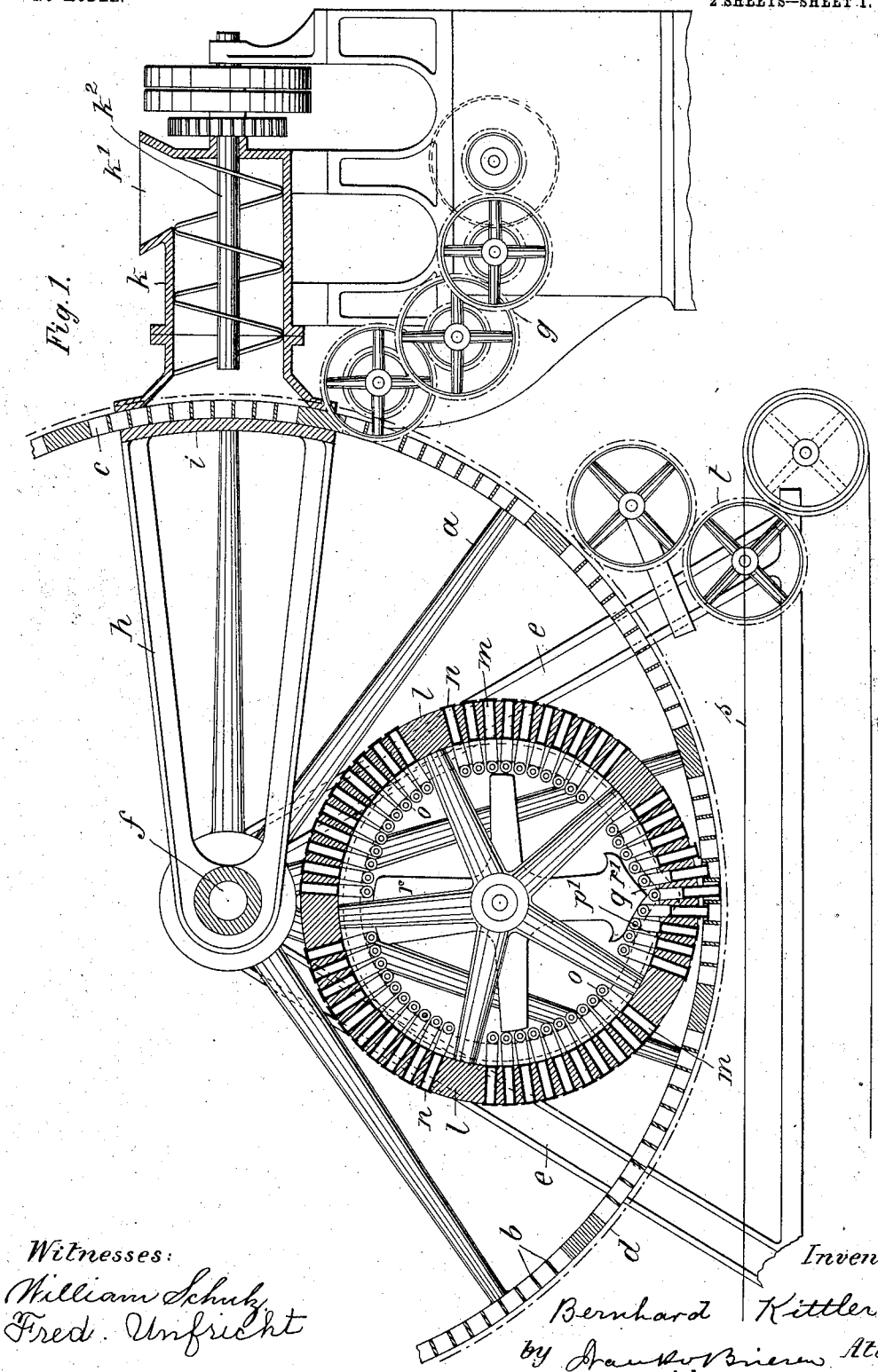
Witnesses:
William Schulz
Fred. Unfricht
Inventor.
Bernhard Kittler
by Frank V. Bieren Att'y.

No. 769,170. PATENTED SEPT. 6, 1904.
B. KITTLER.
MACHINE FOR MANUFACTURING PEAT BRICKS.
APPLICATION FILED MAR. 22, 1904.
NO MODEL. 2 SHEETS—SHEET 2.
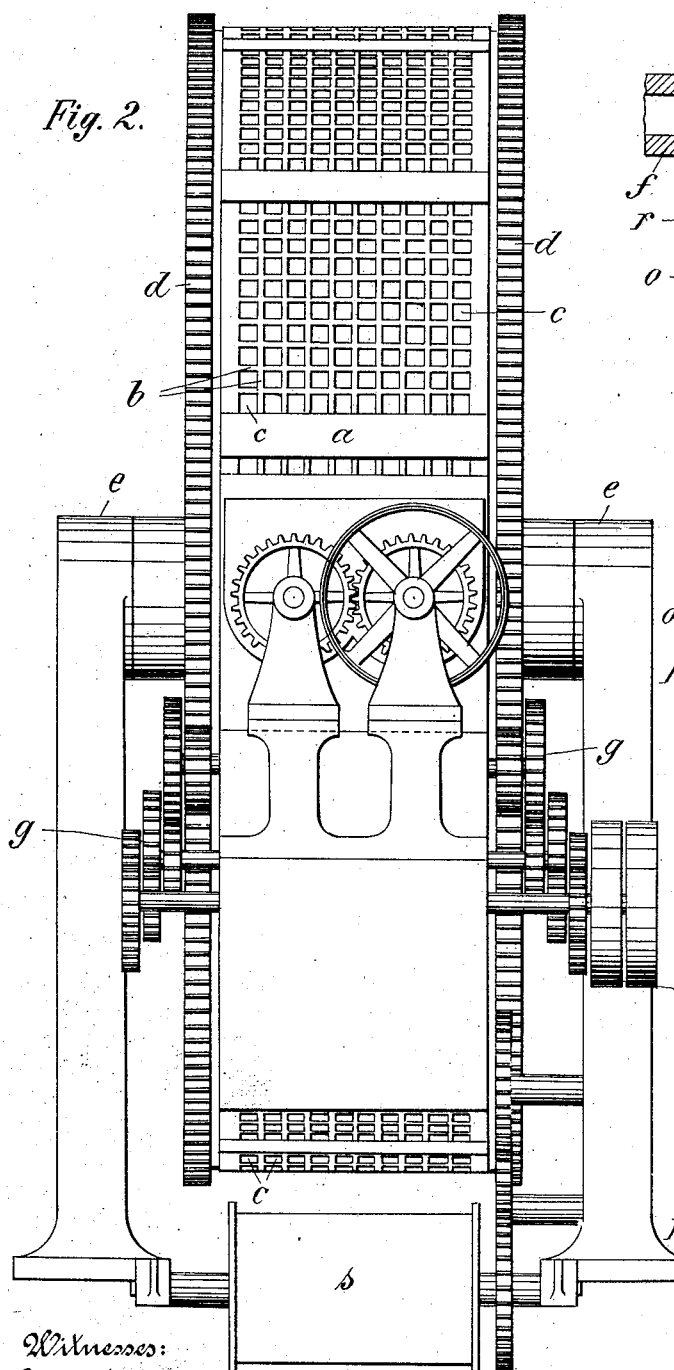
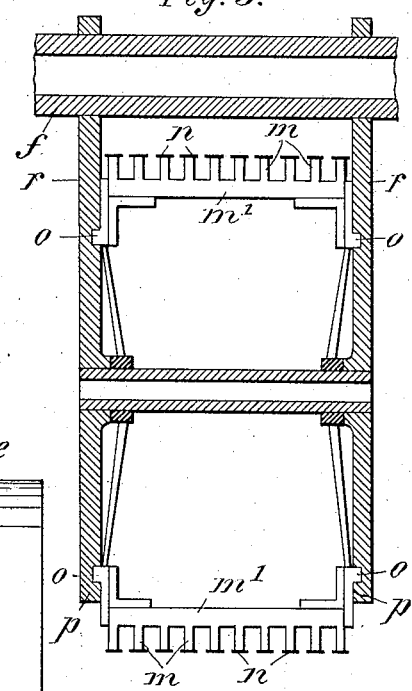
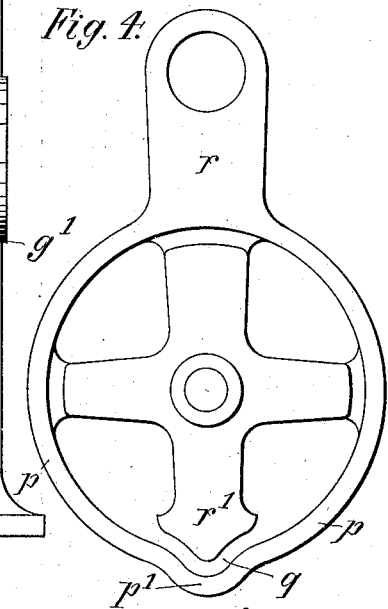
Witnesses:
Inventor:
Bernhard Kittler No. 769,170. Patented September 6, 1904.

UNITED STATES PATENT OFFICE.

BERNHARD KITTLER, OF MEMEL, GERMANY.

MACHINE FOR MANUFACTURING PEAT BRICKS.

SPECIFICATION forming part of Letters Patent No. 769,170, dated September 6, 1904.

Application filed March 22, 1904. Serial No. 199,465. (No model.)

*To all whom it may concern:*

Be it known that I, BERNHARD KITTLER, a subject of the King of Prussia, German Emperor, and a resident of Memel, in the Kingdom of Prussia, German Empire, have invented certain new and useful Improvements in Machines for Manufacturing Peat Bricks, of which the following is an exact specification.

My invention relates to a machine for molding and pressing peat, and more especially to a brick-making machinery possessing a mold-wheel having peripheral molds.

In the manufacture of clay bricks machines with rotating mold-wheels have already been used. When such machines shall, however, be adapted for manufacturing peat bricks, great difficulties arise if a machine of great productiveness and practical operation is to be constructed. In the machines for manufacturing clay bricks the clay is brought into the peripheral molds, in which mold-plungers are provided which form the bottom of the molds and which are moved by means of a cam mechanism of suitable construction so arranged as to discharge the brick after the same has been pressed and molded during its passage from the filling place to the discharge place. If a machine of this kind would be used for the manufacture of peat bricks, the productiveness of the machine would be a relatively small one, as in these machines only mold-wheels of a small diameter can be used. A machine for manufacturing peat bricks can, however, only be practically useful in case considerable quantities of peat can be pressed into bricks in a continuous operation—that is say, in case the advantages of a rotating mold-wheel can be perfectly utilized and a wheel having a great circumference and a great number of molds can be used. In case, however, of a considerable number of molds an equal number of plungers or other means for discharging the bricks from the molds would be necessary, and the construction of the machine would be a very complicated one. In order to do away with this disadvantage, I provide means by which the mold-wheel and the device for discharging the bricks from the molds are separated. I attain this purpose by arranging within the outer mold-wheel a second inner wheel of a smaller diameter, said second wheel being provided with plungers, which are operated by means of a suitable cam mechanism and which are adapted to discharge the bricks from the molds.

In order to make my invention more clear, I refer to the accompanying drawings, in which—

Figure 1 is a vertical longitudinal section of the machine. Fig. 2 is a side view of the same. Fig. 3 is a cross-section of part of the machine, and Fig. 4 is a detail view of the same.

In the drawings, $a$ is the mold-wheel, the periphery of which is divided into several separate divisions, each of which divisions consists of an equal number of cells or molds $c$, separated from one another by means of partitions $b$. The periphery of the wheel is provided with teeth $d$ on both edges of the same.

$f$ is the axle of the wheel, and $e$ represents bearings in which this axle is fixed. The wheel $a$ is continuously rotated under mediation of gearings $g$ from pulley $g'$. To the axle $f$, which is rigidly fixed in the bearings, a frame $h$ is fixed, which is provided with a curved plate $i$, situated opposite to one or several filling-cylinders. The rim of the mold-wheel consequently passes between the plate $i$ and the filling device $k$.

$l$ is a second wheel, situated within the mold-wheel $a$ and journaled in a frame $r$, rigidly fixed to the shaft $f$. This wheel is also divided into several divisions, each division possessing a plurality of plungers corresponding in number to the number of molds of each division of the mold-wheel. The plungers situated in one cross-line are connected to each other, so as to form one single piece. The plungers are advantageously made hollow for the purpose of reducing the weight of the same.

In Fig. 3 two rows of plungers $m$ can be seen in side view. The plungers of each row are all fixed to a common bar $m'$ in the same manner as the teeth of a comb and are provided at their ends with plates $n$, fitting loosely into the cells or molds $c$. Each row of plungers $m$ is provided with two rollers $o$, guided along rails $p$ of frame $r$. The rails $p$ are circular, but have a downward dip $p'$ at the bottom, where they approach the wheel $a$. Opposite this dip is a correspondingly-shaped abutment $r'$ of frame $r$, thus forming an intervening curve or cam-slot $q$. This slot is so formed that the plungers $m$ are pressed outward if the same arrive at the dip of the guides. Thereby the plates $n$, fixed to the plungers, enter into the cells or molds of the mold-wheel and discharge the peat bricks situated in the molds. The bricks consequently fall at the lowest point of the mold-wheel upon a traveling band $s$. The traveling band $s$ is moved by means of a gearing $t$. The velocity with which the traveling band $s$ is moved is equal to the circumferential velocity of the mold-wheel. The plungers situated in the molds are naturally taken along by these molds, thereby effecting the rotation of the wheel $l$. In consequence thereof all the plungers will successively pass the curve $q$ at the lower ends of the guides $p$ and will consequently be pressed downward and discharge the bricks, whereafter they are raised again to their normal position. It will be understood that the plunger-wheel $l$ may also be moved, by means of gears, from the mold-wheel, in which case corresponding devices must be provided for pressing the plungers downward and bringing the same back into their normal position.

As may be seen from Fig. 1, the filling device and the discharge device are situated so that the filled molds move downward. It is thereby attained that the weight of the peat in the molds assists in rotating the wheels. It will also be understood that any convenient filling device may be provided. In the example shown in the drawings the filling device consists of a cylinder $k$, having hopper $k'$ and conveyer-screw $k^2$.

What I claim is—

In a machine for manufacturing peat bricks, the combination of an outer wheel having molds, with a separate inner wheel, guide-rails at the sides of the inner wheel, a cross-bar that engages the guide-rails, and plungers mounted on the cross-bar and adapted to be projected through the inner wheel into the molds of the outer wheel, substantially as specified.

In testimony whereof I have signed my name to this specification in the presence of two subscribing witnesses.

BERNHARD KITTLER.

Witnesses:
M. HANNKE,
A. BUSCHEL.